United States Patent
Sharma et al.

(10) Patent No.: US 11,822,440 B2
(45) Date of Patent: *Nov. 21, 2023

(54) GENERATING STANDBY CLOUD VERSIONS OF A VIRTUAL MACHINE

(71) Applicant: Cohesity, Inc., San Jose, CA (US)

(72) Inventors: Namit Sharma, San Jose, CA (US); Vipin Gupta, Cupertino, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,138

(22) Filed: Jun. 21, 2022

(65) Prior Publication Data
US 2022/0382575 A1    Dec. 1, 2022

Related U.S. Application Data

(63) Continuation of application No. 16/660,623, filed on Oct. 22, 2019, now Pat. No. 11,397,649.

(51) Int. Cl.
*G06F 11/14* (2006.01)
*G06F 9/455* (2018.01)
*G06F 11/07* (2006.01)

(52) U.S. Cl.
CPC ...... *G06F 11/1484* (2013.01); *G06F 9/45558* (2013.01); *G06F 11/0709* (2013.01); *G06F 11/1451* (2013.01); *G06F 11/1464* (2013.01); *G06F 11/1469* (2013.01); *G06F 2009/4557* (2013.01); *G06F 2009/45562* (2013.01); (Continued)

(58) Field of Classification Search
CPC ............. G06F 11/1484; G06F 9/45558; G06F 11/0709; G06F 11/1451; G06F 11/1464; G06F 11/1469; G06F 2009/45562; G06F 2009/45595; G06F 2201/84
See application file for complete search history.

(56) References Cited

U.S. PATENT DOCUMENTS 7,421,648 B1    9/2008   Davis
7,437,764 B1    10/2008  Sobel
(Continued)

OTHER PUBLICATIONS

"Backup Solution Guide"—Synology https://download.synology.com/download/www-res/brochure/backup_solution_guide_en-global.pdf (Year: 2019).

(Continued)

*Primary Examiner* — Wissam Rashid
(74) *Attorney, Agent, or Firm* — Van Pelt, Yi & James LLP

(57) ABSTRACT

Contents of a virtual machine of a primary storage are received at a first point in time. A full snapshot of the virtual machine is stored on a secondary storage using the received contents of the virtual machine. One or more cloud storage volumes of the virtual machine are caused to be created. Contents of the full snapshot for storage on the one or more cloud storage volumes are provided from the secondary storage. Changed data of the virtual machine of the primary storage is received at a second point in time. An incremental snapshot of the virtual machine is stored using the received changed data. The one or more cloud storage volumes are updated using the incremental snapshot of the virtual machine. An image of at least one of the cloud storage volumes is caused to be created for standby deployment of another instance of the virtual machine.

20 Claims, 9 Drawing Sheets

(52) U.S. Cl.
CPC .............. *G06F 2009/45583* (2013.01); *G06F 2009/45595* (2013.01); *G06F 2201/84* (2013.01)

(56) References Cited

U.S. PATENT DOCUMENTS

| | | |
|---|---|---|
| 8,020,037 B1 | 9/2011 | Schwartz |
| 8,086,585 B1 | 12/2011 | Brashers |
| 8,112,661 B1 | 2/2012 | La France |
| 8,190,583 B1 | 5/2012 | Shekar |
| 8,312,471 B2 | 11/2012 | Davis |
| 8,364,648 B1 | 1/2013 | Sim-Tang |
| 8,607,342 B1 | 12/2013 | Liao |
| 9,268,689 B1 | 2/2016 | Chen |
| 9,304,864 B1 | 4/2016 | Bushman |
| 9,311,190 B1 | 4/2016 | Bushman |
| 9,361,185 B1 | 6/2016 | Bushman |
| 9,471,441 B1 * | 10/2016 | Lyadvinsky ........ G06F 11/1484 |
| 9,489,230 B1 | 11/2016 | Patwardhan |
| 9,594,514 B1 | 3/2017 | Bono |
| 9,621,428 B1 | 4/2017 | Lev |
| 9,983,812 B1 | 5/2018 | Don |
| 10,037,223 B2 | 7/2018 | Park |
| 10,089,148 B1 | 10/2018 | Blitzer |
| 10,162,528 B2 | 12/2018 | Sancheti |
| 10,169,077 B1 | 1/2019 | Sigl, Sr. |
| 10,175,896 B2 | 1/2019 | Battaje |
| 10,275,321 B1 | 4/2019 | Bajaj |
| 10,496,497 B1 | 12/2019 | Yadav |
| 10,503,612 B1 | 12/2019 | Wang |
| 10,545,776 B1 | 1/2020 | Kowalski |
| 10,877,928 B2 | 12/2020 | Nagrale |
| 10,896,097 B1 | 1/2021 | Purcell |
| 11,036,594 B1 | 6/2021 | Shats |
| 11,176,154 B1 | 11/2021 | Dasgupta |
| 2003/0033344 A1 | 2/2003 | Abbott |
| 2004/0250033 A1 | 12/2004 | Prahlad |
| 2006/0069861 A1 | 3/2006 | Amano |
| 2006/0182255 A1 | 8/2006 | Luck, Jr. |
| 2007/0153675 A1 | 7/2007 | Baglin |
| 2008/0208926 A1 | 8/2008 | Smoot |
| 2009/0089657 A1 | 4/2009 | Davis |
| 2009/0171707 A1 | 7/2009 | Bobak |
| 2009/0313503 A1 | 12/2009 | Atluri |
| 2010/0031170 A1 | 2/2010 | Carullo |
| 2010/0070725 A1 | 3/2010 | Prahlad |
| 2010/0106933 A1 | 4/2010 | Kamila |
| 2010/0122248 A1 | 5/2010 | Robinson |
| 2011/0022879 A1 | 1/2011 | Chavda |
| 2011/0106776 A1 | 5/2011 | Vik |
| 2011/0107246 A1 | 5/2011 | Vik |
| 2012/0203742 A1 | 8/2012 | Goodman |
| 2013/0006943 A1 | 1/2013 | Chavda |
| 2013/0179481 A1 | 7/2013 | Halevy |
| 2013/0191347 A1 | 7/2013 | Bensinger |
| 2013/0219135 A1 | 8/2013 | Knowles |
| 2013/0227558 A1 | 8/2013 | Du |
| 2013/0232480 A1 | 9/2013 | Winterfeldt |
| 2013/0232497 A1 | 9/2013 | Jalagam |
| 2013/0254402 A1 | 9/2013 | Vibhor |
| 2013/0262387 A1 * | 10/2013 | Varadharajan ........ G06F 16/214 707/639 |
| 2013/0322335 A1 | 12/2013 | Smith |
| 2014/0040206 A1 | 2/2014 | Ramakrishnan |
| 2014/0052692 A1 | 2/2014 | Zhang |
| 2014/0059306 A1 | 2/2014 | Bender |
| 2014/0165060 A1 | 6/2014 | Muller |
| 2014/0297588 A1 | 10/2014 | Babashetty |
| 2014/0359229 A1 | 12/2014 | Cota-Robles |
| 2014/0372553 A1 | 12/2014 | Blackburn |
| 2015/0193487 A1 | 7/2015 | Demidov |
| 2015/0254150 A1 | 9/2015 | Gordon |
| 2015/0278046 A1 | 10/2015 | Zellermayer |
| 2015/0347242 A1 | 12/2015 | Martos |
| 2015/0363270 A1 | 12/2015 | Hammer |
| 2015/0370502 A1 | 12/2015 | Aron |
| 2015/0378765 A1 | 12/2015 | Singh |
| 2016/0004450 A1 | 1/2016 | Avinash |
| 2016/0034356 A1 | 2/2016 | Aron |
| 2016/0048408 A1 | 2/2016 | Madhu |
| 2016/0070714 A1 | 3/2016 | D Sa |
| 2016/0085636 A1 | 3/2016 | Dornemann |
| 2016/0125059 A1 * | 5/2016 | Jain ....................... G06F 16/128 707/639 |
| 2016/0162378 A1 | 6/2016 | Garlapati |
| 2016/0188898 A1 | 6/2016 | Karinta |
| 2016/0203060 A1 | 7/2016 | Singh |
| 2016/0232061 A1 | 8/2016 | Gaschler |
| 2016/0321339 A1 | 11/2016 | Tekade |
| 2016/0357640 A1 | 12/2016 | Bushman |
| 2016/0357641 A1 | 12/2016 | Bushman |
| 2016/0357769 A1 | 12/2016 | Bushman |
| 2017/0031613 A1 | 2/2017 | Yee |
| 2017/0031622 A1 | 2/2017 | Nagarajan |
| 2017/0060710 A1 | 3/2017 | Ramani |
| 2017/0060884 A1 | 3/2017 | Goodman |
| 2017/0123935 A1 | 5/2017 | Pandit |
| 2017/0168903 A1 | 6/2017 | Dornemann |
| 2017/0185491 A1 | 6/2017 | Hajare |
| 2017/0185729 A1 | 6/2017 | Boray |
| 2017/0193116 A1 | 7/2017 | Wong |
| 2017/0206212 A1 | 7/2017 | Srivilliputtur Mannarswamy |
| 2017/0212680 A1 | 7/2017 | Waghulde |
| 2017/0337109 A1 | 11/2017 | Ramu |
| 2018/0004437 A1 | 1/2018 | Battaje |
| 2018/0004764 A1 | 1/2018 | Sudarsanam |
| 2018/0060106 A1 | 3/2018 | Madtha |
| 2018/0060187 A1 | 3/2018 | Chavda |
| 2018/0081766 A1 | 3/2018 | Ghuge |
| 2018/0081902 A1 | 3/2018 | Mckenzie |
| 2018/0088973 A1 | 3/2018 | Subhraveti |
| 2018/0095846 A1 | 4/2018 | Sanakkayala |
| 2018/0113625 A1 | 4/2018 | Sancheti |
| 2018/0196820 A1 | 7/2018 | Kremer |
| 2018/0212896 A1 | 7/2018 | Chang |
| 2018/0253414 A1 | 9/2018 | Hailpern |
| 2018/0293374 A1 | 10/2018 | Chen |
| 2018/0316577 A1 | 11/2018 | Freeman |
| 2018/0329637 A1 | 11/2018 | Battaje |
| 2019/0065277 A1 | 2/2019 | Raikov |
| 2019/0073276 A1 | 3/2019 | Yuen |
| 2019/0108266 A1 | 4/2019 | Manvar |
| 2019/0129799 A1 | 5/2019 | Kumarasamy |
| 2019/0132203 A1 | 5/2019 | Wince |
| 2019/0197020 A1 | 6/2019 | Yap |
| 2019/0215358 A1 | 7/2019 | Kobayashi |
| 2019/0220198 A1 | 7/2019 | Kashi Visvanathan |
| 2019/0228097 A1 | 7/2019 | Kassa |
| 2019/0278662 A1 | 9/2019 | Nagrale |
| 2019/0278663 A1 | 9/2019 | Mehta |
| 2020/0026538 A1 | 1/2020 | Cui |
| 2020/0034254 A1 | 1/2020 | Natanzon |
| 2020/0057567 A1 | 2/2020 | Hutcheson |
| 2020/0057669 A1 | 2/2020 | Hutcheson |
| 2020/0110755 A1 | 4/2020 | Waldman |
| 2020/0159625 A1 | 5/2020 | Hutcheson |
| 2020/0167238 A1 | 5/2020 | Killamsetti |
| 2020/0183794 A1 | 6/2020 | Dwarampudi |
| 2020/0233571 A1 | 7/2020 | Yuravlivker |
| 2020/0278274 A1 | 9/2020 | Shetty |
| 2020/0285449 A1 | 9/2020 | Mcintosh |
| 2020/0394072 A1 | 12/2020 | Sreekantaswamy |
| 2021/0056203 A1 | 2/2021 | Qiao |
| 2021/0081087 A1 | 3/2021 | Wayne |
| 2021/0103556 A1 | 4/2021 | Nagrale |
| 2021/0232579 A1 | 7/2021 | Schechter |
| 2021/0318851 A1 | 10/2021 | Sahu |
| 2021/0385254 A1 | 12/2021 | Pettit |

OTHER PUBLICATIONS

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

(56) References Cited

OTHER PUBLICATIONS

Actifio. "Getting Started with Actifio VDP." Sep. 23, 2020. https://web.archive.org/web/20200923181125/https://docs.actifio.com/10.0/PDFs/Introducing.pdf (Year: 2020).

C. Grace. "Site Recovery Manager Technical Overview." Dec. 1, 2020. https://web.archive.org/web/20201201181602/https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/ https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

\* cited by examiner

GENERATING STANDBY CLOUD VERSIONS OF A VIRTUAL MACHINE

CROSS REFERENCE TO OTHER APPLICATIONS

This application is a continuation of U.S. patent application Ser. No. 16/660,623 entitled GENERATING STANDBY CLOUD VERSIONS OF A VIRTUAL MACHINE filed Oct. 22, 2019, which is incorporated herein by reference for all purposes.

BACKGROUND OF THE INVENTION

A primary system may host a virtual machine. A version of the virtual machine may be backed up to a cloud environment. A full backup or an incremental backup of the virtual machine may be performed. The full backup may include all of the data associated with the virtual machine. The incremental backup may include all of the data associated with the virtual machine since a previous backup. Performing a full backup of the virtual machine each time that a backup is to be performed is costly because it may take a long time to perform (e.g., hours) and/or reduce a performance of the primary system on which the virtual machine is hosted.

BRIEF DESCRIPTION OF THE DRAWINGS

Various embodiments of the invention are disclosed in the following detailed description and the accompanying drawings.

DETAILED DESCRIPTION

Figure 1:
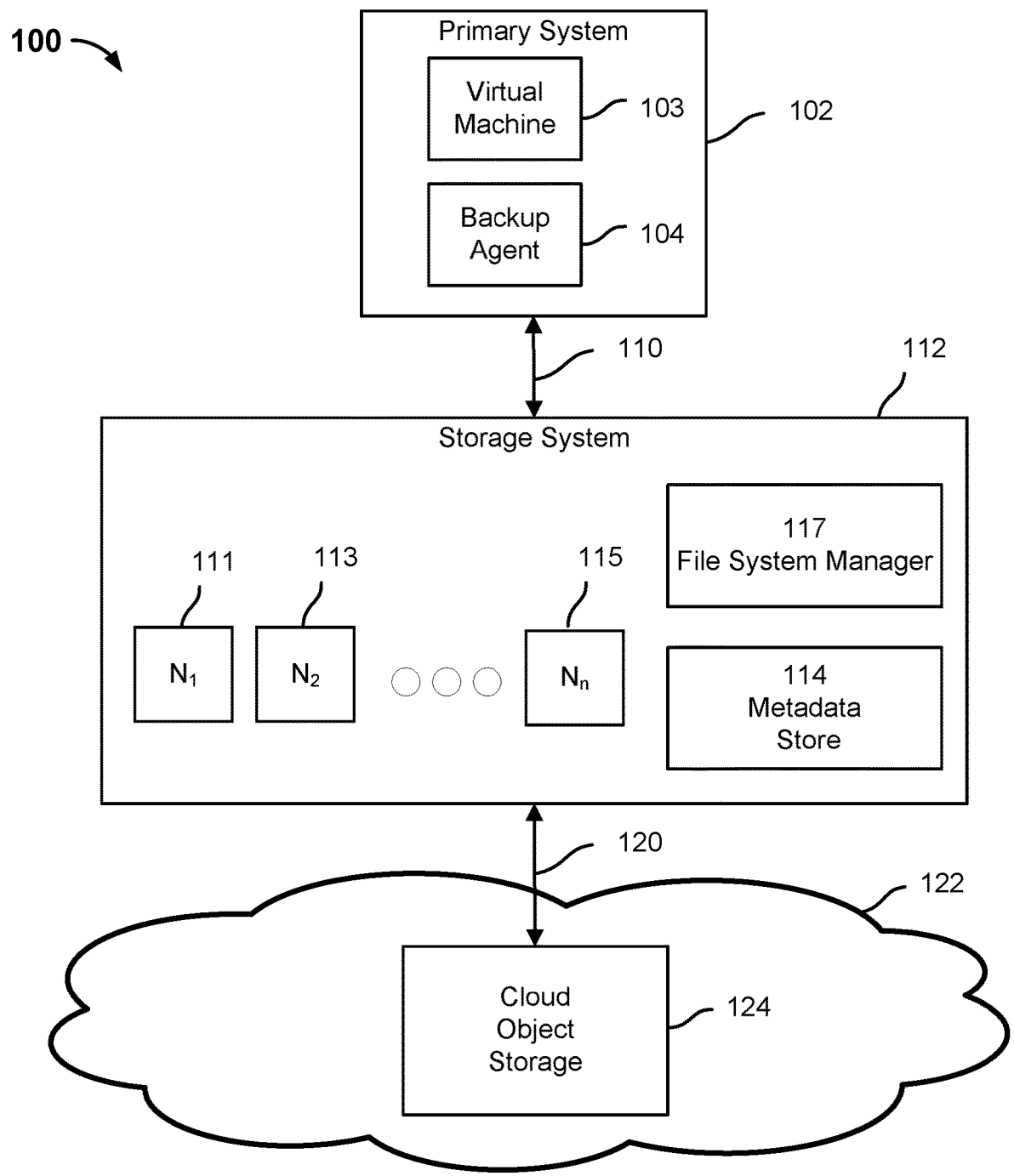
FIG. 1 is a block diagram illustrating an embodiment of a system for generating one or more standby versions of a virtual machine.

A primary system may host a virtual machine. The primary system may include a boot disk associated with the virtual machine. The virtual machine may have its own associated data disk. A backup snapshot of the virtual machine may be performed. The backup snapshot may be a full snapshot or an incremental snapshot. A full snapshot may include all of the data associated with a virtual machine. An incremental snapshot may include all of the data associated with the virtual machine that was not included in a previous backup snapshot. The data included in a backup snapshot may be backed up to a storage system.

The storage system may ingest the data included in a backup snapshot and store one or more backup versions of the virtual machine. The data included in the backup snapshot may be organized using a tree data structure as described in U.S. patent application Ser. No. 16/110,314 entitled "Incremental Virtual Machine Metadata Extraction," filed on Aug. 23, 2018, the entire contents of which are incorporated by reference. The primary system may go offline for one or more reasons, which causes the virtual machine to also go offline. A version of the virtual machine may be restored from the storage system to a cloud environment, which may allow a user of the primary system to access a cloud version of the virtual machine. This may reduce the amount of downtime associated with the virtual machine because the user may not need to wait for the primary system to come back online before the user is able to access the virtual machine.

A version of the virtual machine may be maintained in a standby mode in a cloud object storage. The standby version of the virtual machine is a version of the virtual machine that is ready to be deployed to a cloud instance in a cloud environment (e.g., a virtual machine in the cloud). Deploying a standby version of the virtual machine may further reduce the amount of downtime associated with the virtual machine because the amount of time needed to restore a cloud version of the virtual machine from the cloud object storage to a cloud instance of the cloud environment is less than the amount of time needed to restore a cloud version of the virtual machine from the storage system to a cloud instance of the cloud environment.

The standby version of the virtual machine may be generated according to one or more standby policies. For example, a standby version of the virtual machine may be generated periodically (e.g., every 4 hours). A standby version of the virtual machine may be generated after a threshold amount of new data associated with the virtual machine has been backed up. A standby version of the virtual machine may be generated in response to a command received from a user associated with the virtual machine.

A cloud environment may host a cloud instance (e.g., EC2 instance). The cloud instance may be associated with one or more cloud storage volumes. A standby version of the virtual machine may be generated in part by copying the virtual machine data stored on the storage system to the one or more cloud storage volumes associated with the cloud instance of the cloud environment. At a first point in time, a full snapshot of the virtual machine may be provided from the storage system to the cloud instance of the cloud environment. The full snapshot may be comprised of all of the boot data associated with a version of a virtual machine and all of the virtual machine data associated with the version of the virtual machine. In response to receiving the data associated with the full snapshot, the cloud instance may be configured to store the virtual machine boot data in a cloud storage volume corresponding to virtual machine boot data (e.g., "a virtual machine boot volume") attached to the cloud instance and store the virtual machine data in a cloud storage volume corresponding to the virtual machine data (e.g., "a virtual machine data volume") attached to the cloud instance. In some embodiments, the cloud instance of the cloud environment includes a single storage volume corresponding to the virtual machine boot data and the virtual machine data.

A cloud provider may charge a user associated with the virtual machine a certain amount based on the amount of storage capacity provisioned per time in the one or more storage volumes associated with the cloud instance. Maintaining data associated with the virtual machine in the one or more storage volumes associated with a cloud instance of the cloud environment may be expensive. To reduce costs, a standby version of the virtual machine may be stored in a cloud object storage because storing the standby version of the virtual machine in a cloud object storage is cheaper than storing the data associated with the virtual machine in the one or more storage volumes associated with the cloud instance. The standby version of the virtual machine may be stored in the cloud object storage to enable at a later point in time a user associated with the virtual machine to deploy a cloud version of the virtual machine.

The standby version of the virtual machine may be generated based on the data stored in the one or more storage volumes associated with the cloud instance. The standby version of the virtual machine is a version of the virtual machine that is ready to be deployed to a cloud instance hosted in a cloud environment. The standby version of the virtual machine may be stored in a cloud object storage of the cloud environment. Deploying the standby version of a virtual machine from cloud object storage to a cloud instance in a cloud environment may be faster than restoring a backed up version of a virtual machine from a storage system to the cloud environment. This may further reduce the amount of downtime associated with the virtual machine in the event the primary system goes offline.

The standby version of the virtual machine may be generated by taking a snapshot of the storage volume corresponding to virtual machine boot data and a snapshot of the volume corresponding to the virtual machine virtual machine data, and then subsequently generating an image of the storage volume corresponding to virtual machine boot data based on the snapshot of the storage volume corresponding to virtual machine boot data. The image of the storage volume corresponding to virtual machine boot data, the snapshot of the storage volume corresponding to virtual machine boot data, and the snapshot of the volume corresponding to the virtual machine data may be stored in a cloud object storage of the cloud environment. The image of the storage volume corresponding to virtual machine boot data and the snapshot of the volume corresponding to the virtual machine data may be deployed (e.g., instantiated) at any time to a cloud instance to restore the virtual machine.

A subsequent standby version of the virtual machine may be generated. The subsequent standby version may be an incremental version of the previous standby version of the virtual machine, that is, the subsequent standby version of the virtual machine may include the data associated with a previous standby version of the virtual machine and one or more changes to the virtual machine since the previous standby version of the virtual machine. However, certain cloud object storages (e.g., Amazon Simple Storage Service) may not allow data to be written to a particular offset. This may prevent a storage system from updating a previous standby version by writing data (e.g., the incremental data changes) to the cloud object storage that is storing the previous standby version of the virtual machine.

The subsequent standby version of the virtual machine may be generated at least in part by attaching one or more storage volumes to a cloud instance. The data associated with the snapshot of the storage volume corresponding to virtual machine boot data and the data associated with the snapshot of the volume corresponding to the virtual machine data may be copied from the cloud object storage to the one or more storage volumes attached to the cloud instance. For example, the data associated with the snapshot of the virtual machine boot data may be copied to the storage volume corresponding to virtual machine boot data and the data associated with the snapshot of the volume corresponding to the virtual machine data may be copied to the storage volume corresponding to virtual machine data.

A backup version of the virtual machine may be stored on the storage system using a tree data structure. The tree data structure described in U.S. patent application Ser. No. 16/110,314 entitled "Incremental Virtual Machine Metadata Extraction," filed on Aug. 23, 2018, may enable the storage system to determine not only the differences between backup versions of the virtual machine, but also the file offsets associated with the differences between backup versions of the virtual machine. The data chunks included in the file offsets associated with the differences between backup versions of the virtual machine may be identified and provided to the cloud instance in the cloud environment. The subsequent standby version of the virtual machine may be generated at least in part by applying the data chunks to their associated file offsets in the one or more storage volumes of the cloud instance. For example, one or more data chunks corresponding to one or more changes to the virtual machine boot data may be applied to the volume corresponding to the virtual machine boot data and/or one or more data chunks corresponding to one or more changes to the virtual machine data may be applied to the volume corresponding to the virtual machine data.

As discussed above, maintaining the data associated with a virtual machine in the one or more storage volumes of the cloud instance is expensive. The subsequent standby version of the virtual machine may be generated in part by taking a snapshot of the storage volume corresponding to virtual machine boot data and a snapshot of the volume corresponding to the virtual machine data and then subsequently generating an image of the storage volume corresponding to virtual machine boot data based on the snapshot of the storage volume corresponding to virtual machine boot data. The image of the storage volume corresponding to virtual machine boot data, the snapshot of the storage volume corresponding to virtual machine boot data, and the snapshot of the volume corresponding to the virtual machine data may be stored in a cloud object storage of the cloud environment. The image of the storage volume corresponding to virtual machine boot data and the snapshot of the volume corresponding to the virtual machine data may be deployed (e.g., instantiated) to the cloud instance to restore the virtual machine to a version corresponding to the standby version of the virtual machine. The snapshot of the storage volume corresponding to virtual machine boot data and the snapshot of the storage volume corresponding to virtual machine data may be copied to one or more storage volumes attached to a cloud instance to enable another subsequent cloud version of the virtual machine to be generated.

The above process may be repeated for one or more subsequent standby versions of the virtual machine. The differences between a production version of a virtual machine hosted on a primary system and a standby version of the virtual machine may be reduced as the frequency at which standby versions of the virtual machine and backups is increased. Accordingly, the amount of time needed to get a production system back to a particular state may be reduced since a more recent version of the virtual machine may be deployed from the cloud object storage in the event the primary system and the storage system are offline.

FIG. 1 is a block diagram illustrating an embodiment of a system for generating one or more standby versions of a virtual machine. In the example shown, system 100 is comprised of primary system 102, storage system 112, and cloud environment 122. Primary system 102 is coupled to storage system 112 via connection 110. Connection 110 may be a wired or wireless connection. Connection 110 may be a LAN, WAN, intranet, the Internet, and/or a combination thereof. Storage system 112 is coupled to cloud environment 122 via connection 120. Connection 120 may be a wired or wireless connection. Connection 120 may be a LAN, WAN, intranet, the Internet, and/or a combination thereof.

Primary system 102 may be comprised of a virtual machine 103 and a backup agent 104. Although FIG. 1 depicts one virtual machine 103, primary system 102 may host one or more other virtual machines. Primary system 102 may include one or more storage volumes (not shown) that are configured to store file system data associated with primary system 102. The file system data associated with primary system 102 includes the data associated with virtual machine 103.

Primary system 102 is a computing system that stores file system data. The file system data may include a plurality of files (e.g., content files, text files, etc.) and metadata associated with the plurality of files. For example, one of the files may be a virtual machine container file that corresponds to virtual machine 103. Primary system 102 may be comprised of one or more servers, one or more computing devices, one or more storage devices, and/or a combination thereof. Primary system 102 may be configured to send a backup snapshot of file system data to storage system 112 according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with primary system 102.

Backup agent 104 may be configured to cause primary system 102 to perform a backup snapshot of virtual machine 103. The backup snapshot may be a full snapshot or an incremental snapshot. A full snapshot may include all of the file system data associated with virtual machine 103 at a particular moment in time. An incremental snapshot may include all of the file system data associated with virtual machine 103 that was not included in a previous backup snapshot. Backup agent 104 may cause primary system 102 to perform a backup snapshot according to the backup snapshot policy. Backup agent 104 may receive an instruction to perform a backup snapshot from storage system 112. In some embodiments, backup agent 104 is optional. In the event primary system 102 does not include backup agent 104, an application associated with virtual machine 103 may cause a backup snapshot (full or incremental) of virtual machine 103.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, or a combination thereof. Each storage node may have its own corresponding processor. Storage system 112 may be configured to ingest a backup snapshot received from primary system 102 and configured to store the data associated with the backup snapshot across the storage cluster. Storage system 112 may be a cloud version of a secondary storage system as described in U.S. patent application Ser. No. 16/287,214 entitled "Deploying A Cloud Instance Of A User Virtual Machine," filed on Feb. 27, 2019, the entire contents of which are incorporated by reference.

Storage system 112 may include a file system manager 117 that is configured to organize the file system data of the backup snapshot using a tree data structure. The tree data structure may provide a view of the file system data corresponding to a backup snapshot. The view of the file system data corresponding to the backup snapshot may be comprised of a file system metadata snapshot tree and one or more file metadata trees. The file system metadata snapshot tree is configured to store metadata associated with the file system data. A file metadata tree may correspond to one of the files included in the backup snapshot and store the metadata associated with a file. For example, a file metadata tree may correspond to a virtual machine container file (e.g., virtual machine image file, virtual machine disk file, etc.) associated with virtual machine 103.

Regardless if the view of the file system data corresponds to a full snapshot or an incremental snapshot, the view of the file system data corresponding to the backup snapshot is a fully hydrated backup snapshot that provides a complete view of primary system 102 corresponding to a moment in time when the backup snapshot was performed. A fully hydrated backup is a backup that is ready for use without having to reconstruct a plurality of backups to use it. Other systems may reconstruct a backup by starting with a full backup and applying one or more changes associated with one or more incremental backups to the data associated with the full backup. In contrast, any file stored in the storage volume of a primary system at a particular time and the file's contents, for which there is an associated backup snapshot, may be determined from the file system metadata snapshot tree, regardless if the associated backup snapshot was a full snapshot or an incremental snapshot.

Creating an incremental snapshot may only include copying data of the storage volume(s) that was not previously backed up. However, the file system metadata snapshot tree corresponding to the incremental snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume, virtual machine, and/or a database. In contrast, other recovery/restoration methods may require significant time, storage, and computational resources to reconstruct a particular version of a volume, virtual machine, and/or database from a full backup and a series of incremental backups. The view of file system data may allow any file (e.g., a virtual machine container file) that was stored on primary system 102 at the time the corresponding backup snapshot was performed to be retrieved, restored, or replicated.

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. The root node corresponds to a particular backup snapshot of file system data. Each intermediate node includes one or more pointers to other nodes (e.g., a lower intermediate node or a leaf node). A leaf node of the file system metadata snapshot tree may store data associated with a file for a file that is less than or equal to a limit size (e.g., 256 kB). A leaf node of the file system metadata snapshot tree may be an index node (inode). A leaf node of the file system metadata snapshot tree may store a pointer to a file metadata tree for a file that is greater than the limit size.

A file metadata tree includes a root node, one or more levels of one or more intermediate nodes associated with the root node, and one or more leaf nodes associated with an intermediate node of the lowest intermediate level. A leaf node of a file system metadata snapshot tree may include a pointer to the root node of the file metadata tree. A file metadata tree is similar to a file system metadata snapshot tree, but a leaf node of a file metadata tree may include an identifier of a data brick associated with one or more data chunks of the file. For example, a leaf node of a file metadata tree may include an identifier of a data brick associated with one or more data chunks of a virtual machine container file. The location of the data chunks associated with a data brick may be identified using a table stored in a metadata store that matches brick numbers (i.e., a brick identifier) to chunk identifiers (e.g., SHA-1) or the location of the data brick may be identified based on the pointer to the data brick. The brick identifier may be used to identify a corresponding chunk identifier. A file table may associate chunk identifiers (e.g., SHA-1) with chunk files. A virtual machine may be comprised of a plurality of chunk files. A chunk file is configured to store a plurality of data chunks. The file table may include an association of a location of a chunk identifier with an offset within a chunk file. The identified chunk identifier may be used to identify the chunk file that stores one or more data chunks associated with a file and a file offset within the identified chunk file.

Cloud environment 122 may correspond to a public cloud (e.g., Amazon Web Services, Microsoft Azure, Google Cloud, etc.) associated with a cloud provider. Cloud environment 122 may correspond to a private cloud associated with a cloud provider. Cloud environment 122 may include cloud object storage 124, which is configured to store one or more standby versions of virtual machine 103.

Primary system 102 may go offline for one or more reasons, which causes virtual machine 103 to also go offline. A version of virtual machine 103 may be restored to cloud environment 122, which may allow a user of the primary system to access a cloud version of virtual machine 103. This may reduce the amount of downtime associated with virtual machine 103 because the user may not need to wait for primary system 102 to come back online before the user is able to access virtual machine 103. A version of virtual machine 103 may be maintained in a standby mode in cloud object storage 124. The standby version of virtual machine 103 is a version of virtual machine 103 that is ready to be deployed to a cloud instance hosted in cloud environment 122. The manner in which a standby version of virtual machine 103 is generated is further described with respect to FIGS. 2A-2D.

The standby version of virtual machine 103 may be generated according to one or more standby policies. For example, a standby version of virtual machine 103 may be generated periodically (e.g., every 4 hours). A standby version of virtual machine 103 may be generated each time primary system 102 hosting virtual machine 103 performs a backup snapshot that includes data associated with virtual machine 103. A standby version of virtual machine 103 may be generated after a threshold amount of new data associated with virtual machine 103 has been backed up to storage system 112. A standby version of virtual machine 103 may be generated in response to a command received from a user associated with virtual machine 103. Deploying the standby version of virtual machine 103 from cloud object storage 124 to a cloud instance in cloud environment 122 may be faster than restoring a backed up version of virtual machine 103 from storage system 112 to a cloud instance in cloud environment 122. This may further reduce the amount of downtime associated with virtual machine 103 in the event the primary system 102 hosting virtual machine 103 goes offline.

Figure 2A:
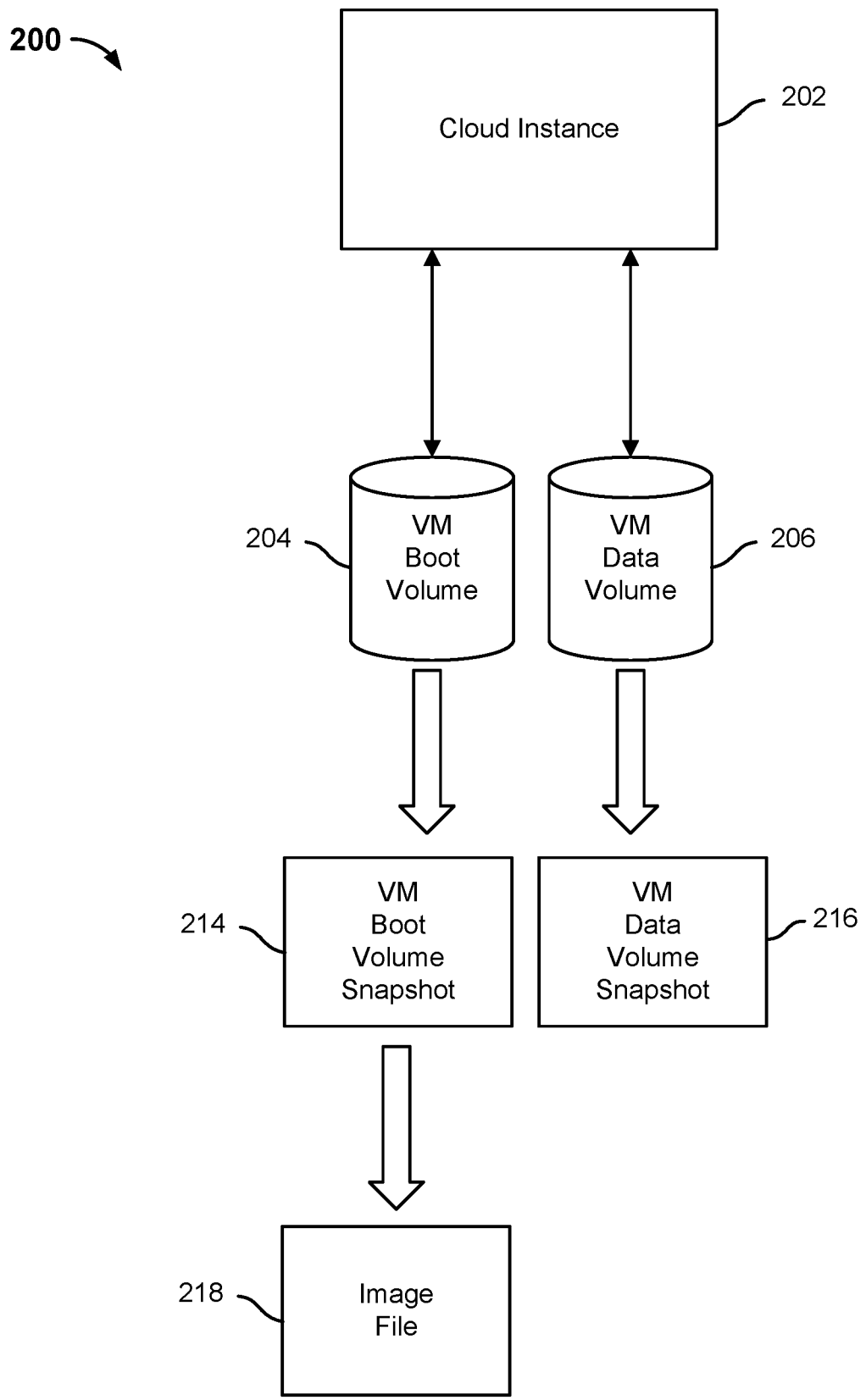
FIG. 2A is a block diagram illustrating an embodiment of a cloud environment for generating an initial standby version of a virtual machine.

FIG. 2A is a block diagram illustrating an embodiment of a cloud environment for generating an initial standby version of a virtual machine. In the example shown, cloud environment 200 is comprised of a cloud instance 202, a virtual machine boot volume 204, and a virtual machine data volume 206. Cloud instance 202 may have its own associated boot volume (not shown) that is separate from virtual machine boot volume 204. Cloud environment 200 may be implemented as a cloud environment, such as cloud environment 122.

The boot data associated with a virtual machine may be stored in virtual machine boot volume 204 and the virtual machine data associated with the virtual machine may be stored in virtual machine data volume 206.

A storage system, such as storage system 112, may provide to cloud instance 202, data associated with a backed up version of a virtual machine. The data associated with the backed up version of the virtual machine may be a full snapshot of a virtual machine and include all of the data associated with the virtual machine. The storage system may organize the data associated with the backed up version of the virtual machine using a tree data structure. A tree data structure, such as a file metadata tree corresponding to a virtual machine, may be traversed to locate the data associated with the backed up version of the virtual machine. An example of a file metadata tree corresponding to a virtual machine is described in U.S. patent application Ser. No. 16/110,314 entitled "Incremental Virtual Machine Metadata Extraction," filed on Aug. 23, 2018. The located data associated with the backed up version of the virtual machine may be provided to cloud instance 202.

In response to receiving the data associated with the virtual machine, cloud instance 202 may be configured to store the boot data associated with the backed up version of the virtual machine in virtual machine boot volume 204 and the virtual machine data associated with the backed up version of the virtual machine in virtual machine data volume 206.

Maintaining the data associated with a virtual machine in volumes 204, 206 associated with cloud instance 202 of cloud environment 200 may be expensive. To reduce costs and maintenance resources, a standby version of the virtual machine may be stored in a cloud object storage because storing the standby version of the virtual machine in a cloud object storage is cheaper than storing the data associated with the virtual machine in volumes 204, 206. The standby version of the virtual machine may be stored in a cloud object storage, such as cloud object storage 124, to enable at a later point in time a user associated with the virtual machine to deploy a cloud version of the virtual machine.

An initial standby version of the virtual machine may be generated based on the data stored in the volumes 204, 206 of cloud instance 202. The initial standby version of the virtual machine is a version of the virtual machine that is ready to be deployed to a cloud instance hosted in a cloud environment. The initial standby version of the virtual machine may be stored in a cloud object storage of the cloud environment (e.g., cloud object storage 124). Deploying (e.g., instantiating) the initial standby version of the virtual machine from the cloud object storage to the cloud environment may be faster than restoring a backed up version of the virtual machine from a storage system, such as storage system 112, to the cloud environment.

The initial standby version of the virtual machine may be generated by taking a snapshot of virtual machine boot volume 204 and a snapshot of virtual machine data volume 206, and then subsequently generating an image 218 of the snapshot of the virtual machine boot volume 204. Virtual machine boot volume 204 and virtual machine data volume 206 may be torn down after corresponding snapshots are generated. The image 218 of the snapshot of the volume corresponding to virtual machine boot data, the snapshot of the volume corresponding to the virtual machine boot data, and the snapshot of the volume corresponding to the virtual machine data may be stored in a cloud object storage of the cloud environment (e.g., cloud object storage 124). The image 218 of the storage volume corresponding to virtual machine boot data and the snapshot of the volume corresponding to the virtual machine data may be deployed at any time to a cloud instance to restore the virtual machine.

Figure 2B:
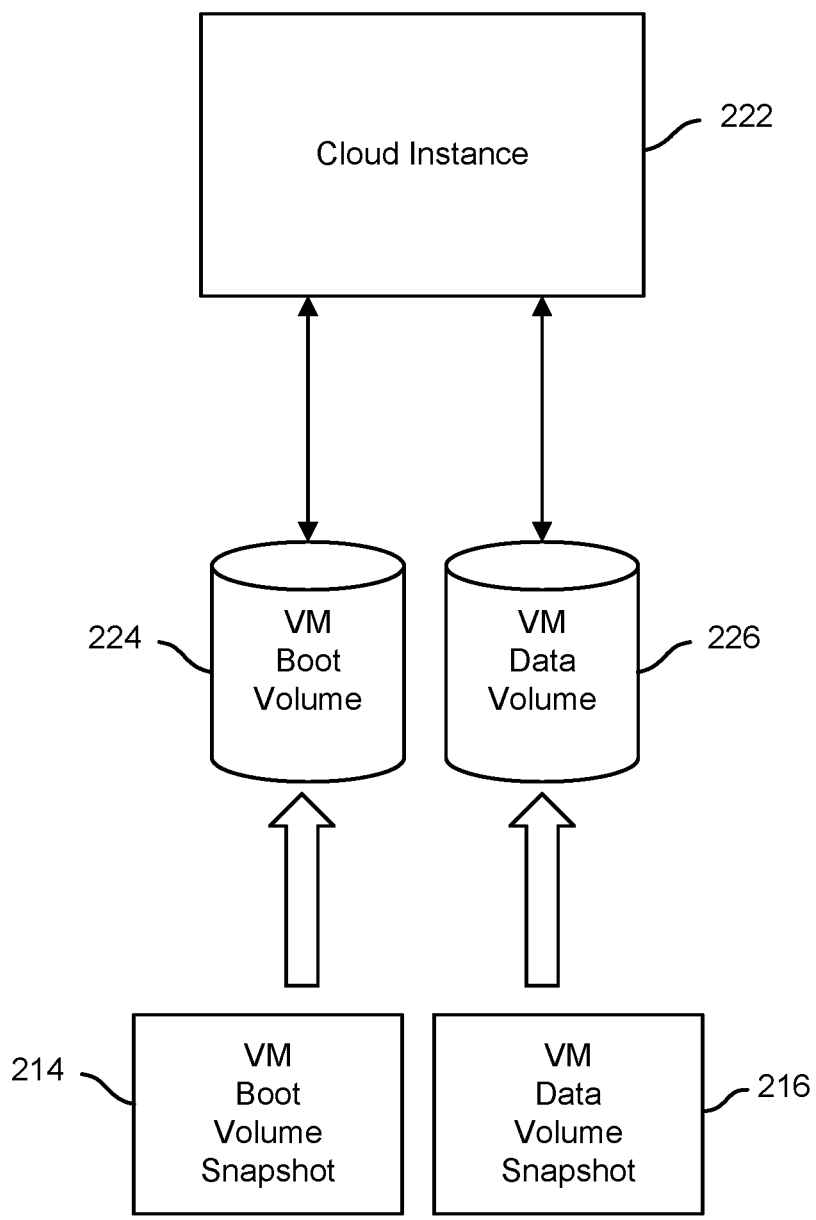
FIG. 2B is a block diagram illustrating an embodiment of a cloud environment for generating a subsequent standby version of a virtual machine.

FIG. 2B is a block diagram illustrating an embodiment of a cloud environment for generating a subsequent standby version of a virtual machine. In the example shown, cloud environment 225 is comprised of a cloud instance 222, virtual machine boot volume 224, and virtual machine data volume 226. Cloud environment 225 may be implemented as a cloud environment, such as cloud environment 122.

A subsequent standby version of a virtual machine may be generated. The subsequent standby version may be an incremental version of the previous standby version of the virtual machine, that is, the subsequent standby version of the virtual machine may include the data associated with a previous standby version of the virtual machine and one or more changes to the virtual machine since the previous standby version of the virtual machine was generated. For example, the subsequent standby version may be an incremental version of the standby version generated in FIG. 2A.

Certain cloud object storages (e.g., Amazon Simple Storage Service) may not allow data to be written to a particular offset. This may prevent a storage system, such as storage system 112, from updating a previous standby version by writing data (e.g., the incremental data changes) to the cloud object storage that is storing the previous standby version of the virtual machine. A subsequent standby version of the virtual machine may be generated at least in part by attaching volumes 224, 226 to cloud instance 222. The cloud instance may be the same cloud instance that generated a previous standby version of the virtual machine or a different cloud instance.

Virtual machine boot volume snapshot 214 and virtual machine data volume snapshot 216 may be associated with a previous standby version of a virtual machine. Virtual machine boot volume snapshot 214 and virtual machine data volume snapshot 216 may be stored in a cloud object storage. The data associated with virtual machine boot volume snapshot 214 may be copied from a cloud object storage to virtual machine boot volume 224 and the data associated with virtual machine data volume snapshot 216 may be copied from the cloud object storage to virtual machine data volume 226. In response to the data associated with virtual machine boot volume snapshot 214 being stored in virtual machine boot volume 224 and the data associated with virtual machine data volume snapshot 216 being stored in virtual machine data volume 226, cloud instance 222 is configured to generate a subsequent standby version of the virtual machine.

Figure 2C:
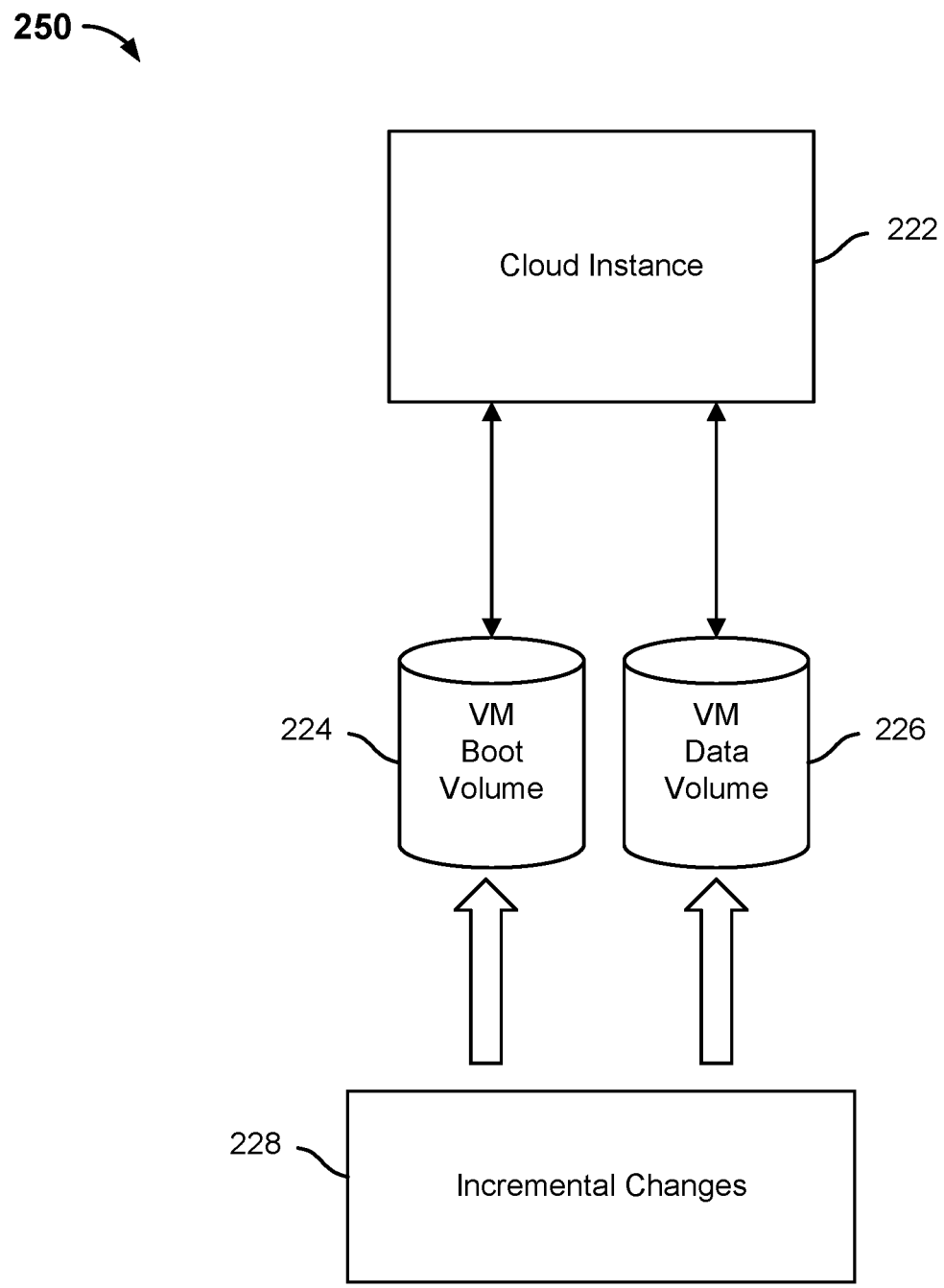
FIG. 2C is a block diagram illustrating an embodiment of a cloud environment for generating a subsequent standby version of a virtual machine.

FIG. 2C is a block diagram illustrating an embodiment of a cloud environment for generating a subsequent standby version of a virtual machine. In the example shown, cloud environment 250 is comprised of a cloud instance 222, virtual machine boot volume 224, and virtual machine data volume 226. Cloud environment 250 may be implemented as a cloud environment, such as cloud environment 122.

A backup version of the virtual machine may be stored on a storage system, such as storage system 112, using a tree data structure. The backup version of the virtual machine may include one or more data changes that were not included in a standby version of the virtual machine stored in a cloud object storage, such as cloud object storage 124. The tree data structure may enable the storage system to determine not only the differences between backup versions of the virtual machine, but also the file offsets associated with the differences between backup versions of the virtual machine.

A storage system may determine the differences between a backup version of the virtual machine that was used to generate the standby version of the virtual machine and a latest backup version of the virtual machine. Each backup version of the virtual machine has a corresponding tree data structure. The tree data structure corresponding to the backup version of the virtual machine that was used to generate the standby version of the virtual machine and the tree data structure corresponding to the latest backup version of the virtual machine may share one or more nodes. For example, a root node of the tree data structure corresponding to the latest backup version of the virtual machine may share one or more nodes that may include one or more pointers to one or more nodes of the tree data structure corresponding to the backup version of the virtual machine that was used to generate the standby version of the virtual machine. The storage system may traverse the tree data structures to determine the one or more nodes included in the tree data structure corresponding to the latest backup version of the virtual machine that are not shared with the tree data structure corresponding to the backup version of the virtual machine that was used to generate the standby version of the virtual machine.

The one or more nodes that are included in the tree data structure corresponding to the latest backup version of the virtual machine, but not shared with the tree data structure corresponding to the backup version of the virtual machine that was used to generate the standby version of the virtual machine, may include one or more leaf nodes. The one or more leaf nodes may be associated with one or more corresponding data chunks of the latest backup version of the virtual machine. The location of the one or more data chunks associated with a data brick and the file offset of the one or more data chunks may be determined.

A storage system, such as storage system 112, may provide to cloud instance 222, data associated with a backed up version of a virtual machine. The data associated with the backed up version of the virtual machine may be an incremental snapshot of a virtual machine and include all of the data associated with the virtual machine that was not previously included in a previous standby version of the virtual machine. Incremental changes 228 that include the data chunks associated with the one or more leaf nodes that are included in the tree data structure corresponding to the latest backup version of the virtual machine, but not shared with the tree data structure corresponding to the backup version of the virtual machine that was used to generate the standby version of the virtual machine and file offset information associated with the data chunks may be provided to cloud instance 222.

Cloud instance 222 may update storage volumes 224, 226 based on the provided data chunks and provided file offset information associated with the data chunks. After storage volumes 224, 226 are updated, cloud instance 222 may be configured to generate a subsequent standby version of a virtual machine.

Figure 2D:
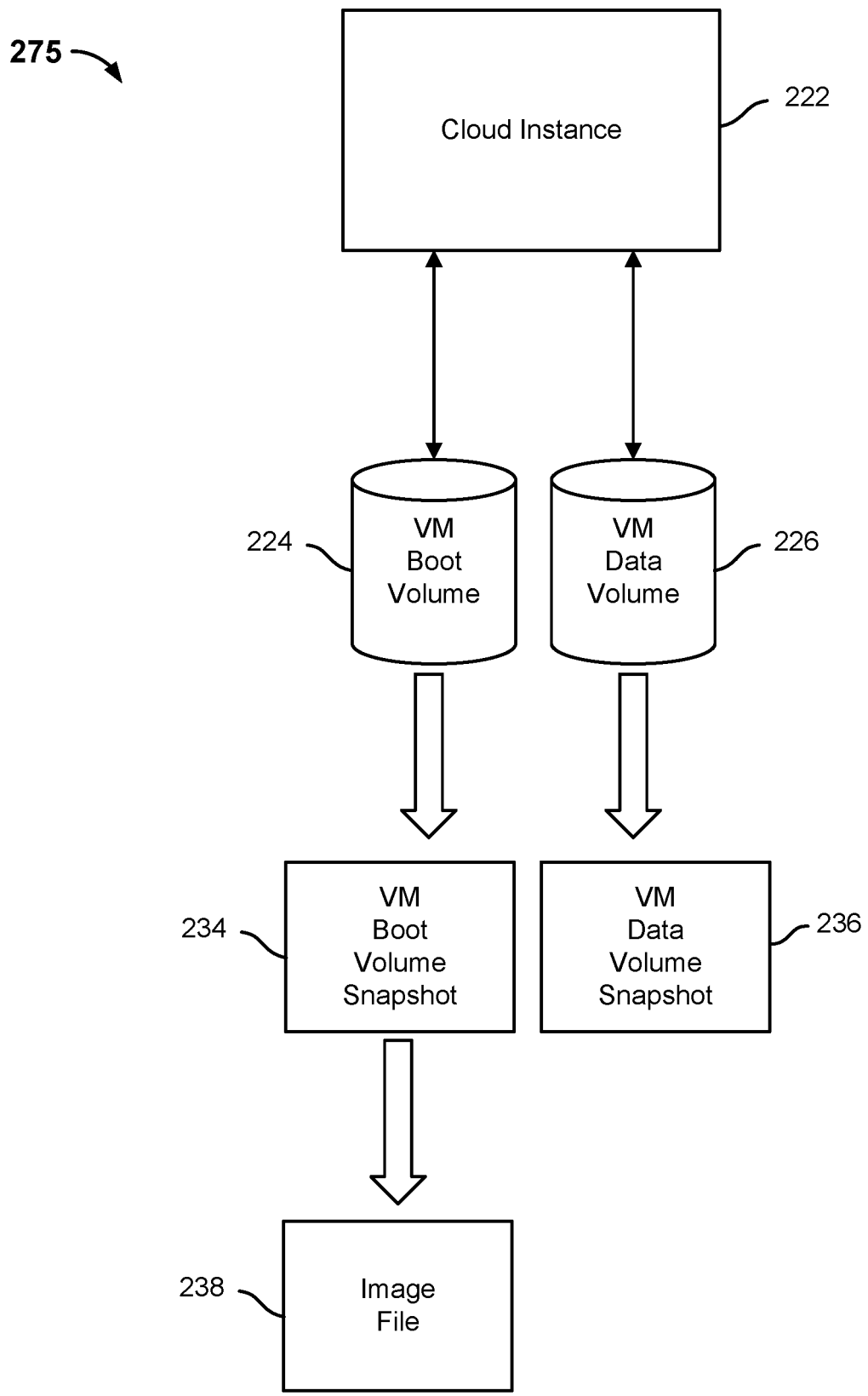
FIG. 2D is a block diagram illustrating an embodiment of a cloud environment for generating a subsequent standby version of a virtual machine.

FIG. 2D is a block diagram illustrating an embodiment of a cloud environment for generating a subsequent standby version of a virtual machine. In the example shown, cloud environment 275 is comprised of a cloud instance 222, virtual machine boot volume 224, and virtual machine data volume 226. Cloud environment 275 may be implemented as a cloud environment, such as cloud environment 122.

As discussed above, maintaining data associated with a virtual machine in storage volumes 224, 226 of cloud instance 222 is expensive. The subsequent standby version of the virtual machine may be generated by taking a snapshot 234 of virtual machine boot volume 224 and a snapshot 236 of virtual machine data volume 226, and then subsequently generating an image file 238 based on virtual machine boot volume snapshot 234. Image file 238, virtual machine boot volume snapshot 234, and virtual machine data volume snapshot 236 may be stored in a cloud object storage of the cloud environment. Image file 238 and VM data volume snapshot 236 may be deployed at any time to one or more storage volumes associated with a cloud instance to restore the virtual machine.

Figure 3A:
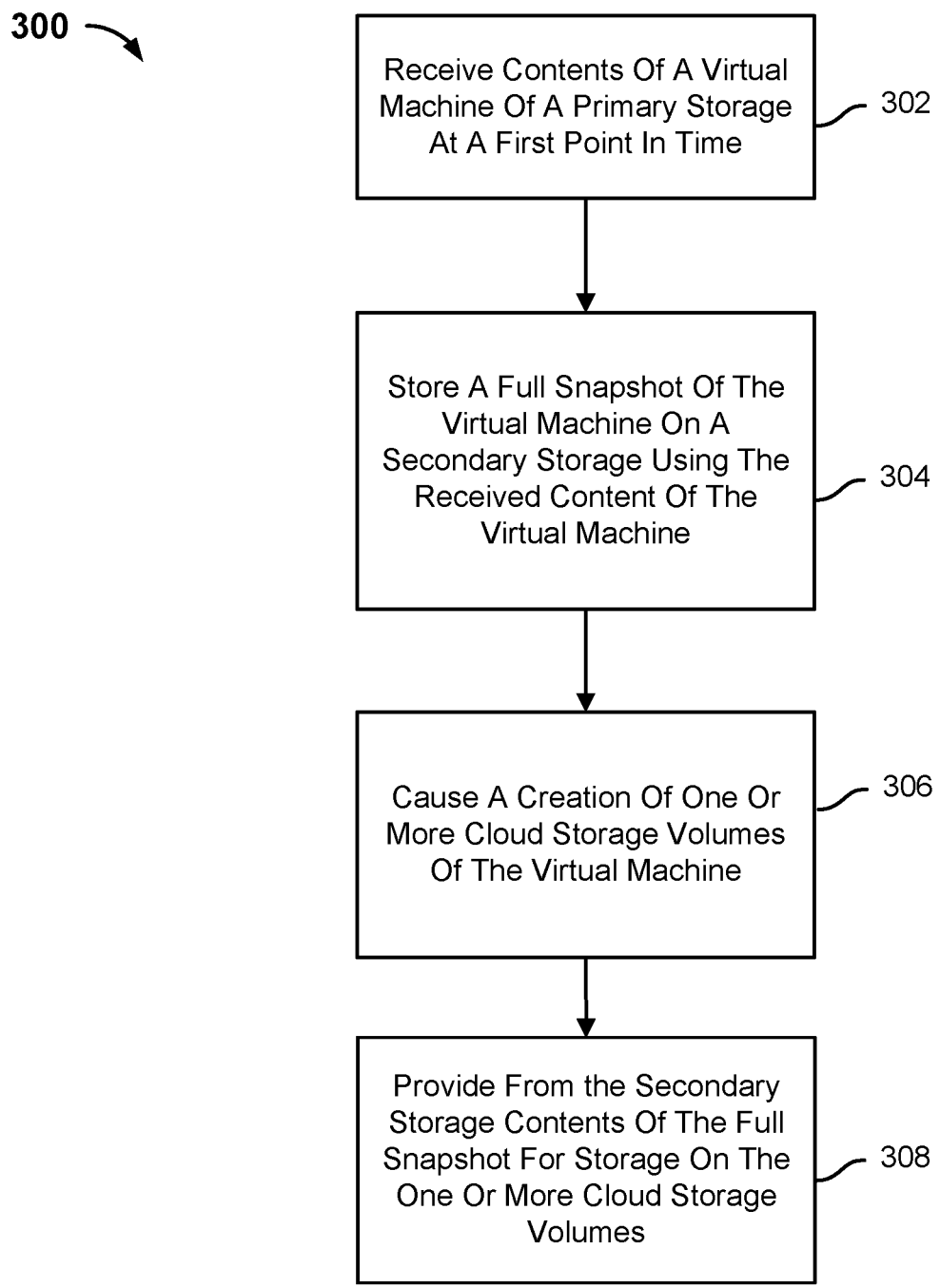
FIG. 3A is a flow chart illustrating an embodiment of a process for generating an initial standby version of a virtual machine.

FIG. 3A is a flow chart illustrating an embodiment of a process for generating an initial standby version of a virtual machine. In the example shown, process 300 may be implemented by a storage system, such as storage system 112.

At 302, contents of a virtual machine of a primary storage are received at a first point in time. A primary system may host a virtual machine. The primary system may include one or more storage volumes that are configured to store data associated with the virtual machine. The primary system may include a backup agent that is configured to cause the primary system to perform a backup snapshot of the virtual machine. The backup snapshot may be a full snapshot. The full snapshot may include all of the file system data associated with the virtual machine.

At 304, a full snapshot of the virtual machine is stored on a secondary storage using the received content of the virtual machine. A storage system may be comprised of a plurality of storage nodes. The contents of the virtual machine may be stored across the plurality of storage nodes. The storage system may include a file system manager that is configured to organize the received content of the virtual machine using a tree data structure.

At 306, one or more cloud storage volumes of the virtual machine are caused to be created. A cloud environment may include a cloud instance. One or more cloud storage volumes may be attached to the cloud instance. A storage system may provide to a cloud provider a command to attach one or more storage volumes to a cloud instance. In response to receiving the command, the cloud provider may attach one or more cloud storage volumes to a cloud instance. The one or more cloud storage volumes may be configured to store data associated with a virtual machine.

At 308, contents of the full snapshot are provided from the secondary storage to the one or more cloud storage volumes. A file system manager of the secondary storage may traverse a tree data structure corresponding to a virtual machine. The file system manager may traverse the tree data structure to locate the data associated with the stored virtual machine. The located data may be provided to the one or more cloud storage volumes. The located data may include boot data associated with the virtual machine and virtual machine data of the virtual machine.

Figure 3B:
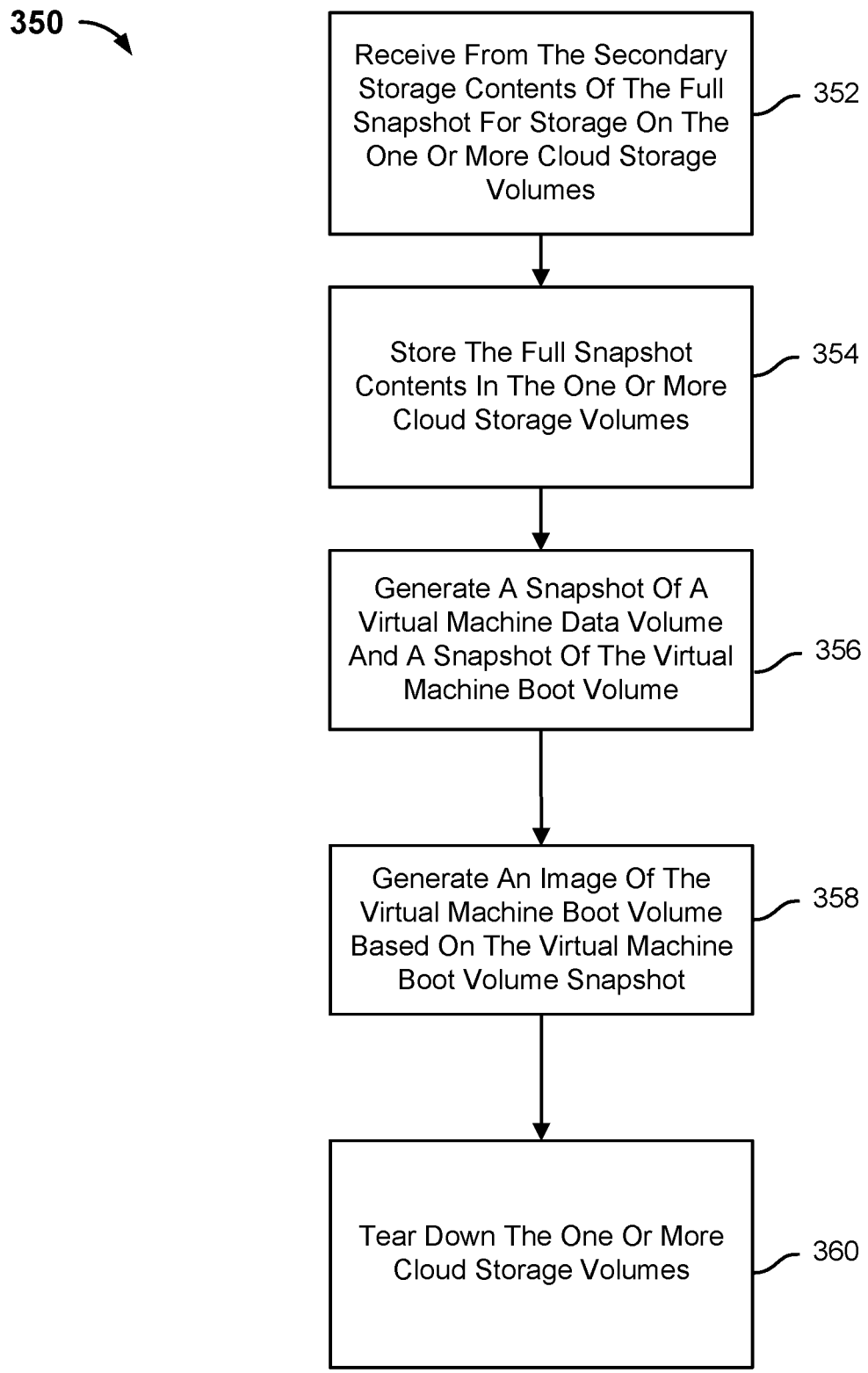
FIG. 3B is a flow chart illustrating an embodiment of a process for generating an initial standby version of a virtual machine.

FIG. 3B is a flow chart illustrating an embodiment of a process for generating an initial standby version of a virtual machine. In the example shown, process 350 may be implemented by a cloud instance, such as cloud instance 202.

At 352, contents of the full snapshot for storage in the one or more cloud storage volumes are received from the secondary storage. The contents of the full snapshot may include boot data associated with a virtual machine and virtual machine data of the virtual machine.

At 354, the full snapshot contents are stored in the one or more cloud storage volumes. The boot data associated with the virtual machine may be stored in a cloud storage volume corresponding to virtual machine boot data and the virtual machine data of the virtual machine may be stored in a cloud storage volume corresponding to the virtual machine data. In some embodiments, the boot data associated with a virtual machine and virtual machine data of the virtual machine are stored in the same cloud storage volume.

A cloud provider may charge a user associated with the virtual machine a certain amount based on the amount of storage capacity provisioned per time in the one or more storage volumes associated with the cloud instance. Maintaining data associated with the virtual machine in the one or more storage volumes associated with a cloud instance of the cloud environment may be expensive. To reduce costs, a standby version of the virtual machine may be stored in a cloud object storage because storing the standby version of the virtual machine in a cloud object storage is cheaper than storing the data associated with the virtual machine in the one or more storage volumes associated with the cloud instance. The standby version of the virtual machine may be stored at a cloud object storage to enable at a later point in time a user associated with the virtual machine to deploy a cloud version of the virtual machine.

At 356, a snapshot of a virtual machine data volume and a snapshot of the virtual machine boot volume are generated. An initial standby version of the virtual machine may be generated based on the data stored in the one or more cloud storage volumes of the cloud instance. The initial standby version of the virtual machine is a version of the virtual machine that is ready to be deployed to a cloud instance hosted in a cloud environment. The initial standby version of the virtual machine may be stored in a cloud object storage of the cloud environment (e.g., cloud object storage 124). Deploying the initial standby version of the virtual machine from the cloud object storage to the cloud environment may be faster than restoring a backed up version of the virtual machine from a storage system to the cloud environment.

At 358, an image of the virtual machine boot volume is generated based on the virtual machine boot volume snapshot. A standby version of a virtual machine may be comprised of a boot volume image and a snapshot of the virtual machine data volume. The image of the boot volume, the snapshot of the virtual machine boot volume, and the snapshot of the virtual machine data volume may be stored in a cloud object storage of the cloud environment. The image of the snapshot of the virtual machine boot data volume and the snapshot of the volume corresponding to the virtual machine data may be deployed at any time to a cloud instance to restore the virtual machine. Deploying the standby version of the virtual machine from the cloud object storage to a cloud environment that includes a cloud instance may be faster than restoring a backed up version of the virtual machine from a storage system to the cloud environment.

At 360, the one or more cloud storage volumes are torn down. This may reduce the resources in maintaining data associated with a virtual machine. In some embodiments, the one or more cloud storage volumes are not torn down based on a frequency at which standby versions of a virtual machine are generated.

Figure 4A:
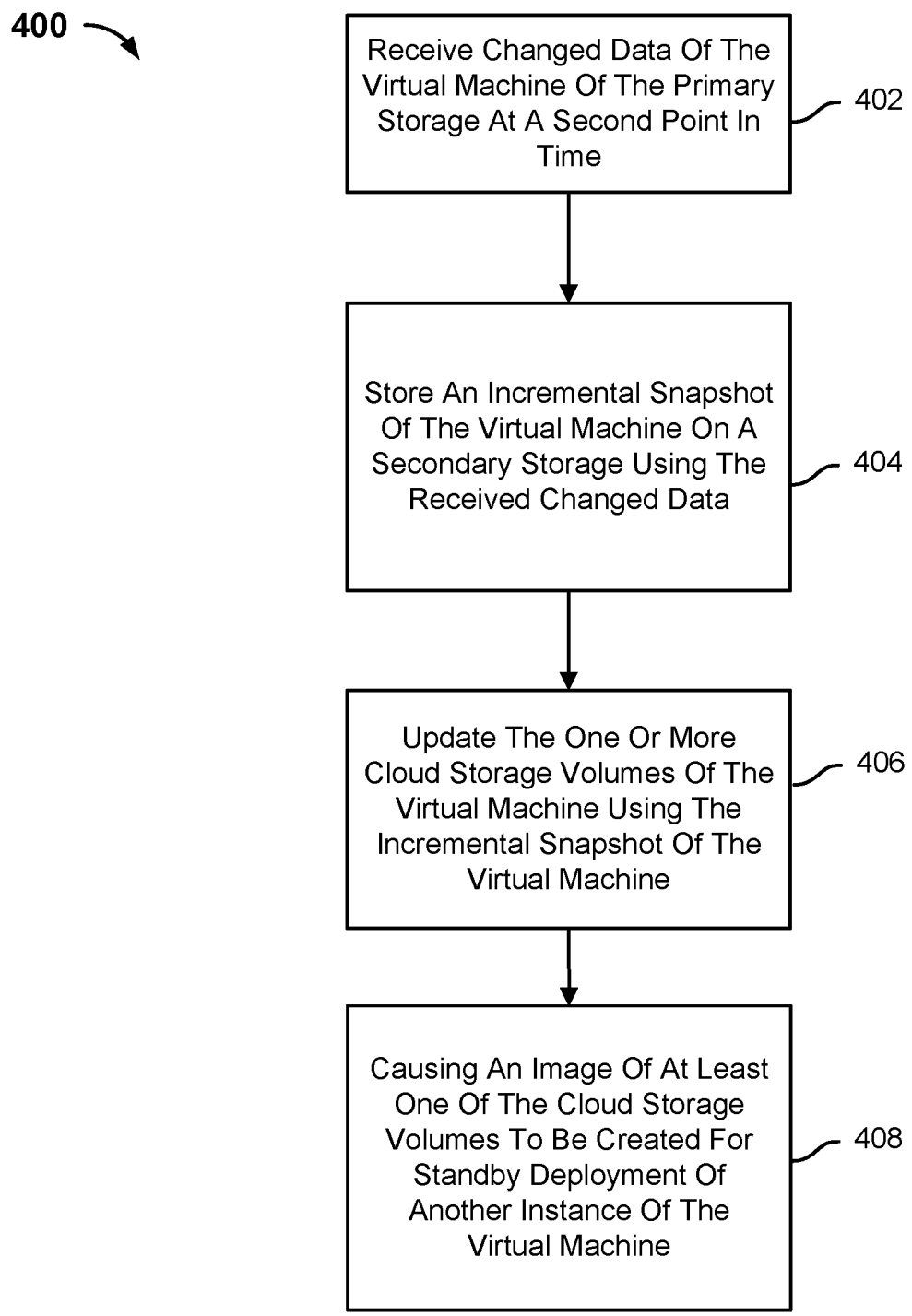
FIG. 4A is a flow chart illustrating an embodiment of a process for generating a subsequent standby version of a virtual machine.

FIG. 4A is a flow chart illustrating an embodiment of a process for generating a subsequent standby version of a virtual machine. In the example shown, process 400 may be implemented by a storage system, such as storage system 112.

At 402, changed data of the virtual machine of the primary storage is received at a second point in time. A primary system may host a virtual machine. The primary system may include one or more storage volumes that are configured to store data associated with the virtual machine. The primary system may include a backup agent that is configured to cause the primary system to perform a backup snapshot of the virtual machine. The backup snapshot may be an incremental snapshot. The incremental snapshot may include all of the file system data associated with the virtual machine that has not been previously backed up.

At 404, an incremental snapshot of the virtual machine is stored on a secondary storage using the received changed data. A storage system may include a file system manager that is configured to organize the received changed data of the virtual machine using a tree data structure. The tree data structure corresponding to the incremental snapshot may include one or more references to the tree data structure corresponding to the full snapshot described in FIG. 3A.

The tree data structure corresponding to the full snapshot may include a root node, one or more levels of one or more intermediate nodes, and one or more leaf nodes. The tree data structure corresponding to the incremental snapshot may include a root node, one or more levels of one or more intermediate nodes, and one or more leaf nodes. The root node of the tree data structure corresponding to the incremental snapshot may include one or more pointers to one or more intermediate nodes of the tree data structure corresponding to the full snapshot. An intermediate node of the tree data structure corresponding to the incremental snapshot may include one or more pointers to one or more leaf nodes of the tree data structure corresponding to the full snapshot. The tree data structure corresponding to the incremental snapshot may include one or more intermediate nodes and one or more leaf nodes that are not included in the tree data structure corresponding to the full snapshot.

At 406, the one or more cloud storage volumes of the virtual machine are updated using the incremental snapshot of the virtual machine. The tree data structure corresponding to the incremental snapshot and the tree data structure corresponding to a previous snapshot (full or incremental) may be traversed to identify one or more leaf nodes that are included in the tree data structure corresponding to the incremental snapshot, but are not included in the tree data structure corresponding to the previous snapshot. The one or more identified leaf nodes may be associated with one or more data chunks associated with a latest version of the virtual machine. The location of the one or more data chunks and a file offset associated with the located data chunks may be determined.

Data chunks associated with the one or more leaf nodes that are included in the tree data structure corresponding to the latest backup version of the virtual machine, but not shared with the tree data structure corresponding to the backup version of the virtual machine that was used to generate the standby version of the virtual machine and file offset information associated with the data chunks may be provided to a cloud instance. A cloud instance may be attached to one or more cloud storage volumes. The cloud instance may update the one or more cloud storage volumes based on the provided data chunks and provided file offset information associated with the data chunks. For example, the cloud instance may update the storage volume at a location corresponding to the file offset information associated with the provided data chunks. After the one or more cloud storage volumes are updated, a subsequent standby version of the virtual machine may be generated.

At 408, an image of at least one of the cloud storage volumes are caused to be created for standby deployment of another instance of the virtual machine. The storage system may provide a command to the cloud provider to generate a standby version of the cloud virtual machine. In response to receiving the command, the cloud provider may cause the cloud instance to generate a standby version of the virtual machine. The standby version of the virtual machine may include an image file associated with a boot volume of the virtual machine and a snapshot of the data volume associated with the virtual machine.

Figure 4B:
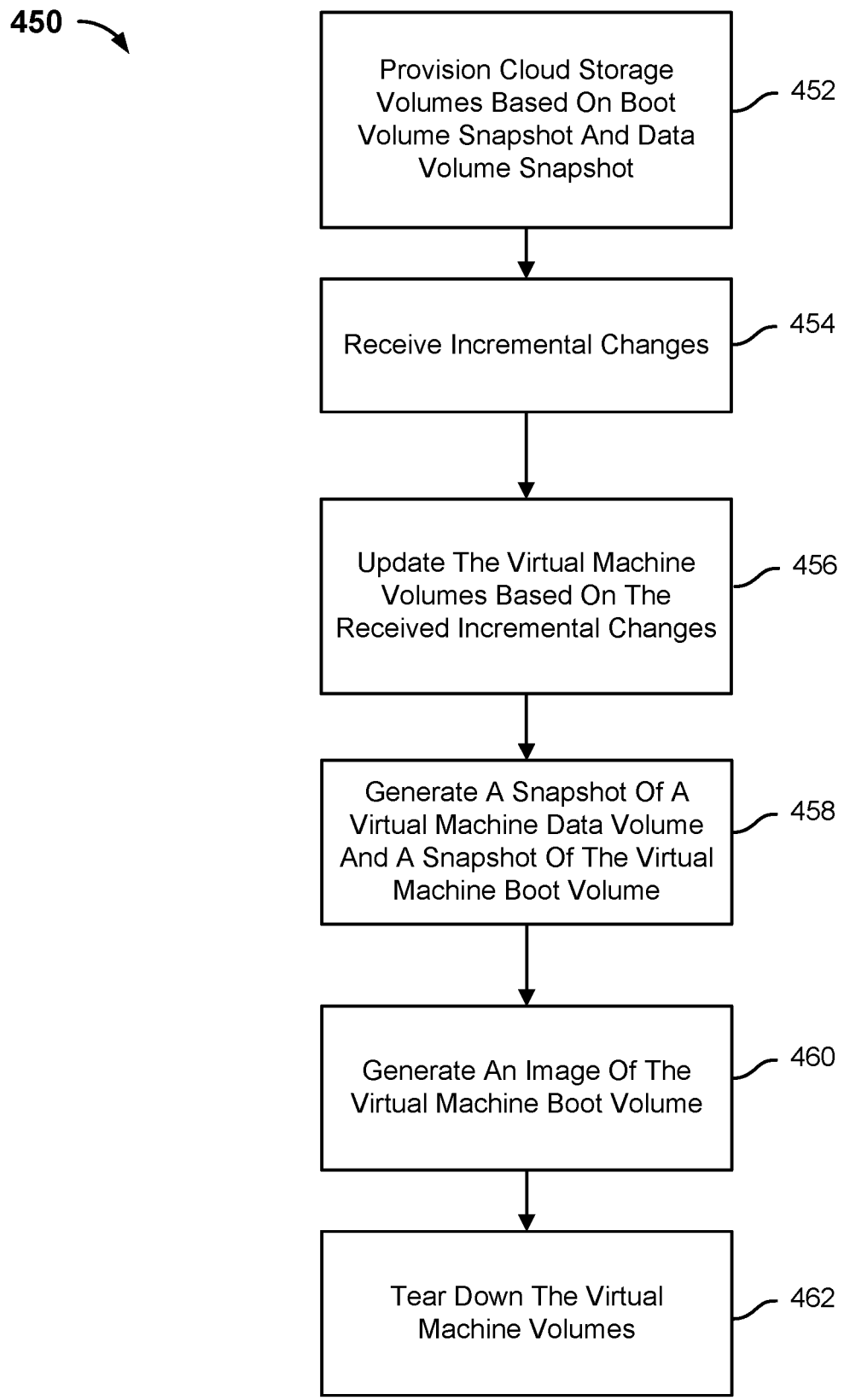
FIG. 4B is a flow chart illustrating an embodiment of a process for generating a subsequent standby version of a virtual machine.

FIG. 4B is a flow chart illustrating an embodiment of a process for generating a subsequent standby version of a virtual machine. In the example shown, process 450 may be implemented by a cloud instance, such as cloud instance 222.

At 452, cloud storage volumes are provisioned based on a boot volume snapshot and a data volume snapshot. A virtual machine boot volume snapshot corresponding to a previous standby version of a virtual machine and virtual machine data volume snapshot corresponding to a previous standby version of a virtual machine may be stored in a cloud object storage. The data associated with the virtual machine boot volume snapshot and the data associated with the virtual machine data volume snapshot may be copied from a cloud object storage to one or more cloud storage volumes.

At 454, incremental changes corresponding to an incremental snapshot of a virtual machine are received. The incremental changes may include data associated with a boot volume of a virtual machine and/or data associated with the virtual machine data. The incremental changes may be identified by a storage system, for example as described with respect to FIG. 4A, and provided to a cloud instance. The incremental changes may also include file offset information of the data associated with a boot volume of a virtual machine and/or file offset information of the data associated with the virtual machine data.

At 456, the virtual machine volumes are updated based on the received incremental changes. The virtual machine volumes may be updated at the file offset locations associated with the received incremental changes. In some embodiments, a boot volume associated with a virtual machine is updated. In some embodiments, a data volume associated with a virtual machine is updated. In some embodiments, a boot volume associated with a virtual machine is updated and a data volume associated with a virtual machine is updated.

Maintaining data associated with the virtual machine in the one or more cloud storage volumes associated with a cloud instance may be expensive. To reduce costs, a standby version of the virtual machine may be stored in a cloud object storage because storing the standby version of the virtual machine in a cloud object storage is cheaper than storing the data associated with the virtual machine in the one or more storage volumes associated with the cloud instance. The standby version of the virtual machine may be stored in the cloud object storage to enable at a later point in time a user associated with the virtual machine to deploy a cloud version of the virtual machine instead of maintaining the virtual machine data in the one or more storage volumes associated with the cloud instance.

At 458, a snapshot of the virtual machine data volume and a snapshot of the virtual machine boot volume are generated. The snapshot of the virtual machine data volume and the snapshot of the virtual machine boot volume may be stored in a cloud object storage of the cloud environment (e.g., cloud object storage 124).

At 460, an image of the virtual machine boot volume is generated based on the snapshot of the virtual machine boot volume. A standby version of a virtual machine may be comprised of a boot volume image and a snapshot of the virtual machine data volume. The image of the boot volume may be stored in a cloud object storage of the cloud environment. The image of the storage volume corresponding to virtual machine boot data and the snapshot of the volume corresponding to the virtual machine data may be deployed at any time to the cloud instance to restore the virtual machine. Deploying the standby version of the virtual machine from the cloud object storage to a cloud environment that includes a cloud instance may be faster than restoring a backed up version of the virtual machine from a storage system to the cloud environment. This may further reduce the amount of downtime associated with the virtual machine in the event the primary system goes offline.

At 462, the virtual machine volumes are torn down. This may reduce the resources in maintaining data associated with a virtual machine. In some embodiments, the one or more cloud storage volumes are not torn down based on a frequency at which standby versions of a virtual machine are generated. For example, the virtual machine volumes may be maintained in the event a subsequent standby version of the virtual machine is to be generated within a threshold time period.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving contents of a virtual machine of a primary storage at a first point in time;
storing a full snapshot of the virtual machine on a secondary storage using the received contents of the virtual machine;
causing a creation of one or more cloud storage volumes of the virtual machine, wherein one or more cloud storage volumes are attached to a cloud instance;
providing from the secondary storage contents of the full snapshot for storage on the one or more cloud storage volumes, wherein an initial standby version of the virtual machine is generated based on the full snapshot, wherein data associated with the initial standby version of the virtual machine is stored in the one or more cloud storage volumes;
receiving changed data of the virtual machine of the primary storage at a second point in time;
storing an incremental snapshot of the virtual machine on the secondary storage using the received changed data;
updating the one or more cloud storage volumes using the incremental snapshot of the virtual machine; and
causing an image of at least one of the cloud storage volumes to be created for standby deployment of another instance of the virtual machine.

2. The method of claim 1, wherein updating the one or more cloud storage volumes using the incremental snapshot of the virtual machine includes providing data associated with the incremental snapshot to the one or more cloud storage volumes.

3. The method of claim 2, wherein updating the one or more cloud storage volumes using the incremental snapshot of the virtual machine includes providing file offset information associated with the provided data.

4. The method of claim 3, wherein the one or more cloud storage volumes are updated based on the provided data and the provided file offset information.

5. The method of claim 4, further comprising generating corresponding snapshots of the one or more cloud storage volumes.

6. The method of claim 5, wherein the image and corresponding snapshots of the one or more cloud storage volumes are stored in a cloud object storage.

7. The method of claim 1, wherein the one or more cloud storage volumes are torn down after a standby version of the virtual machine is generated.

8. The method of claim 1, further comprising determining one or more differences between a first version of the virtual machine corresponding to the full snapshot and a second version of the virtual machine corresponding to the incremental snapshot.

9. The method of claim 1, wherein the initial standby version of the virtual machine is stored in a cloud object storage.

10. The method of claim 1, wherein the initial standby version of the virtual machine is generated by taking a first snapshot of a storage volume corresponding to virtual machine boot data and a second snapshot of a storage volume corresponding to virtual machine data.

11. The method of claim 1, wherein updating the one or more cloud storage volumes using the incremental snapshot of the virtual machine includes applying the received changed data to the initial standby version of the virtual machine stored in the one or more cloud storage volumes.

12. A computer program product, the computer program product being embodied in a non-transitory computer readable storage medium and comprising computer instructions for:
receiving contents of a virtual machine of a primary storage at a first point in time;
storing a full snapshot of the virtual machine on a secondary storage using the received contents of the virtual machine;
causing a creation of one or more cloud storage volumes of the virtual machine, wherein one or more cloud storage volumes are attached to a cloud instance;
providing from the secondary storage contents of the full snapshot for storage on the one or more cloud storage volumes, wherein an initial standby version of the virtual machine is generated based on the full snapshot, wherein data associated with the initial standby version of the virtual machine is stored in the one or more cloud storage volumes;
receiving changed data of the virtual machine of the primary storage at a second point in time;
storing an incremental snapshot of the virtual machine on the secondary storage using the received changed data;
updating the one or more cloud storage volumes using the incremental snapshot of the virtual machine; and
causing an image of at least one of the cloud storage volumes to be created for standby deployment of another instance of the virtual machine.

13. The computer program product of claim 12, wherein updating the one or more cloud storage volumes using the incremental snapshot of the virtual machine includes providing data associated with the incremental snapshot to the one or more cloud storage volumes.

14. The computer program product of claim 13, wherein updating the one or more cloud storage volumes using the incremental snapshot of the virtual machine includes providing file offset information associated with the provided data.

15. The computer program product of claim 14, wherein the one or more cloud storage volumes are updated based on the provided data and the provided file offset information.

16. The computer program product of claim 15, further comprising computer instructions for generating corresponding snapshots of the one or more cloud storage volumes, wherein the image and corresponding snapshots of the one or more cloud storage volumes are stored in a cloud object storage.

17. The computer program product of claim 12, further comprising computer instructions for determining one or more differences between a first version of the virtual machine corresponding to the full snapshot and a second version of the virtual machine corresponding to the incremental snapshot.

18. A system, comprising:
a processor configured to:
receive contents of a virtual machine of a primary storage at a first point in time;
store a full snapshot of the virtual machine using the received contents of the virtual machine;
cause a creation of one or more cloud storage volumes of the virtual machine, wherein one or more cloud storage volumes are attached to a cloud instance;
provide from a secondary storage contents of the full snapshot for storage on the one or more cloud storage volumes, wherein an initial standby version of the virtual machine is generated based on the full snapshot, wherein data associated with the initial standby version of the virtual machine is stored in the one or more cloud storage volumes;
receive changed data of the virtual machine of the primary storage at a second point in time;
store an incremental snapshot of the virtual machine using the received changed data;
update the one or more cloud storage volumes using the incremental snapshot of the virtual machine; and
cause an image of at least one of the cloud storage volumes to be created for standby deployment of another instance of the virtual machine; and
a memory coupled to the processor and configured to provide the processor with instructions.

19. The system of claim 18, wherein to update the one or more cloud storage volumes using the incremental snapshot of the virtual machine, the processor is configured to provide data associated with the incremental snapshot to the one or more cloud storage volumes.

20. The system of claim 19, wherein to update the one or more cloud storage volumes using the incremental snapshot of the virtual machine, the processor is configured to provide file offset information associated with the provided data.

* * * * *